US005188687A

United States Patent [19]
Baum

[11] Patent Number: 5,188,687
[45] Date of Patent: Feb. 23, 1993

[54] LABEL PICKUP AND APPLICATOR ASSEMBLY AND METHOD

[75] Inventor: Morton S. Baum, Hollywood, Fla.

[73] Assignee: Labelmatic, Inc., Hollywood, Fla.

[21] Appl. No.: 665,037

[22] Filed: Mar. 6, 1991

[51] Int. Cl.[5] .............. B32B 31/00
[52] U.S. Cl. .............. 156/64; 156/351; 156/352; 156/361; 156/362; 156/363; 156/566; 156/580
[58] Field of Search .............. 156/361, 362, 363, 566, 156/351, 352, 64, 580

[56] References Cited

U.S. PATENT DOCUMENTS

| | | | |
|---|---|---|---|
| 3,264,161 | 8/1966 | Stremke, Jr. | 156/360 |
| 3,372,079 | 3/1968 | Fellner | 156/360 |
| 3,605,986 | 9/1971 | Navin | 198/460 |
| 3,616,094 | 10/1971 | Navin | 156/571 |
| 3,715,321 | 8/1973 | Hagemann | 502/228 |
| 3,878,909 | 4/1975 | Treiber | 177/145 |
| 3,989,574 | 11/1976 | Evans | 156/566 |
| 4,386,993 | 6/1983 | Matsua | 156/358 |
| 4,406,725 | 9/1983 | Corey | 156/358 |
| 4,436,575 | 3/1984 | Dran et al. | 156/361 |
| 4,913,763 | 4/1990 | Yamazaki et al. | 156/358 |
| 4,927,486 | 5/1990 | Fattal et al. | 156/363 |

FOREIGN PATENT DOCUMENTS 1418916 12/1975 United Kingdom .............. 156/358

*Primary Examiner*—David A. Simmons
*Assistant Examiner*—J. Sells
*Attorney, Agent, or Firm*—Neil F. Markva

[57] ABSTRACT

A labeling method and assembly for automatically applying a price-printed label onto an article having an outer surface. The assembly comprises an alignment mechanism for disposition of an article in a predetermined position within a label-receiving work station. A first sensing element is located to recognize the presence of the article disposed adjacent the alignment mechanism. A label transport arrangement carries a price-printed label from a home position at the label printer to a label-applying position adjacent the outer surface of the article. The first sensing element activates an initiating mechanism for activating the label transport arrangement. A second sensing element recognizes when the label transport arrangement has applied the price-printed label to the outer surface of the article. A retracting mechanism responsive to the second sensing element returns the label transport arrangement to the home position. In a specific embodiment of the method, the article is manually disposed in the predetermined position within the label-receiving work station.

21 Claims, 2 Drawing Sheets

LABEL PICKUP AND APPLICATOR ASSEMBLY AND METHOD

BACKGROUND OF THE INVENTION

This invention relates to a method and assembly for applying labels to articles. More particularly, the invention relates to an automatic labeling method and assembly for applying pressure sensitive labels to random weight packages.

FIELD OF THE INVENTION

Automatic label application devices are used in supermarkets, stores and other businesses for labeling packaged random weight meats, produce and other packaged items. The package is manually or automatically pre-wrapped and placed on a receiving conveyor that transports the package to a weighing scale station, where the net package weight is measured and its price is computed. A label is printed as the package is automatically transported to a label application station. The automatic label application device picks up the label from the printer's label output and affixes it to the surface of the package in a particular orientation. A time interval expires while the package remains in the label application station. And then a take away conveyor removes the finished package from the automatic label assembly.

An alternative to a random weight automatic label application device is a method that places a weight measuring component in a manual film wrap station. When the tray with its random weight product is placed on the manual film wrap station for the purpose of wrapping the package, the tray and contents is weight measured as well as film wrapped. A label printer receives the weight, computes the price and prints a pressure sensitive (adhesive) label that is held on the printers label peeling bar awaiting for the operator to manually pick up the label and affix it to the package.

Such prior art devices are shown in U.S. Pat. Nos. 3,878,909; 3,372,079; 3,605,986; 3,616,094; 3,264,161; and 3,751,321. These patents disclose placing random weight products in trays, that are being film-wrapped, weighed on spring scales that indicate by charts the weight of the contents, and determine the selling price of the product. The operator then handwrites this information or enters it on a label printer keyboard. The completed label, whether handwritten or machine printed, is then manually attached to the package.

The development of a scale that communicated with a label printer made it possible to develop automatic label application devices for supermarkets, stores, and other businesses that package random weight meats, produce, and other products. These prior art automatic functions include weighing, price computation, label printing as well as the application of the label to the package.

The method used to perform these automatic functions is based on a machine tool indexing system which requires that each task be repeated at set distances. Therefore, prior art automatic label application devices include a series of conveyors lined in an order so that each package is automatically transported by conveyor to an automatic work station that is an integral part of the whole device and designed to perform a particular task. Once a particular operation is performed, each package is transported to the next automatic work station, and so on.

The distance traveled as well as the time duration required for each operational segment is identical in the known assemblies. As an example, the operational steps are usually as follows:

1. Stop all conveyors and automatically align the package, then start all conveyors and advance the package to the scale platform.
2. Stop all conveyors and automatically weigh the package, then start all conveyors and advance the package to the automatic labeling station.
3. Stop all conveyors and automatically apply a label to the package, then start all conveyors and advance the package to the automatic labeling station.
4. Stop all conveyors, then start all conveyors removing finished package from the device.

The operation of the prior art automatic labeling device is based on an activity occuring whether or not the article to be processed is there to be processed or whether the task was performed without flaw. Other known prior art systems have unsuccessfully attempted to overcome inherent deficiencies in the earlier models or warn the operator that the system did not properly perform the task for which it was designed.

In all cases the prior art automatic labeling device consists of a conveyor that indexes the package in a machine tool fashion to a fixed weigh station where it pauses for a fixed duration. The extent of the pause is calculated by the time required to measure the maximum scale weight plus a (1) variable factor and (2) any time required in excess of this time for calculating price, printing the label, picking up the label from the label output station and applying it to the package. At best the package will pause at the label application station for a period of time no longer than required to measure a maximum scale weight package plus any safeguard time.

The instant the prior art system stops for weighing and/or labeling whether or not required, the applicator head, engages the label with a suction supplied through a suction opening in the bottom of the head. The applicator head is lowered by a mechanical linkage arrangement and the label is pressed against the top of the package. The moment the timing gear or cam completes the fixed cycle time required the package is transported from the system. Such a prior art system requires that nonrandom weight packages requiring price only pass through all the stages required for random weight packages.

SUMMARY OF THE INVENTION

This invention is directed to the automatic label application of a pressure sensitive adhesive label onto a random weight package that is weight-measured and wrapped at a remote weighing and film-wrapping station. And the label pertaining to said package is printed and issued at another location. As is well known, the size and shape of each random weight package varies for each package in a series of packages.

As a result of the layout of the distributive components, the package is manually taken from the scale and film-wrapping work station location to a remote label printer. An automatic label applicator is disposed adjacent the printer to pick up the label from the printer peeling bar and apply it onto the surface of the package in a given orientation and location.

In particular, the invention relates to an assembly including an applicator to pick up a printed label from a remote printer, means for sensing that the package is properly placed on the label application station, and then applying the label to the surface of the package. A sensing mechanism recognizes when the label is applied and the random weight labeled package is then discharged from the label application station. The label applicator is then returned tot he printer output.

The automatic label applying assembly of the invention comprises a mounting table for the remote label printer. A reciprocally moving applicator head receives a pressure sensitive (adhesive) label as it is peeled from the label dispensing peeling bar of the printer and applies the label to the surface of the package in various orientations and locations. Afterward the package is transported by conveyor to a finished goods area.

The automatic label-applying apparatus of the invention operates without a set duration for each operation as used in the prior art where a rheostat is set to speed or slow a drive motor as required for different sizes of packages and/or weights. This might also involve changing gear and cam sizes for different sizes of packages and/or weights or packages.

The assembly of the invention is for automatically applying a price-printed label onto an article having an outer surface. The assembly comprises alignment means for disposing an article in a predetermined position within a label-receiving work station and first sensing means for recognizing the presence of the article disposed adjacent the alignment means. Label transport means is responsive to the first sensing means and provided for transporting a price-printed label from a home position at the label-printing means to a label-applying position contiguous to the outer surface of the article.

Initiating means responsive to the sensing means activates the label transport means. Actuation means recognizes when the label transport means has applied the price-printed label to the outer surface of the article. And retracting means responsive to the actuation means is for returning the label transport means to the home position.

A more particular feature of the invention is directed to the alignment means which includes article support surface means and article stopper means. The sensing means includes feeler means disposed to touch an article supported by the article support surface means and located adjacent the article stopper means. In a specific embodiment, the feeler means includes a package sensing plate and the initiating means includes control means responsive to the package sensing plate when an article disposed in the label-receiving work station touches the plate. The control means is effective to activate the label transport means located at the home position.

Another feature of the invention is directed to the label transport means which includes label-carrying means and drive means for operating the label-carrying means between the home position and the label-applying position. The initiating means includes first control means responsive tot he sensing means when an article is recognized within the label-receiving work station. The first control means is effective to activate the drive means for operating the label-carrying means from the home position to the label applying position. In a specific embodiment, the first control means includes electronic processor means, and first switch means sends an electrical signal to the electronic processor means when an article is recognized by the sensing means.

Another feature of the invention is directed to the retracting means which includes second control means responsive to the actuation means when the label transport means is recognized to have applied the price-printed label to the article. The second control means is effective to activate the drive means for returning the label-carrying means from the label-applying position to the home position. In a specific embodiment, the second control means includes electronic processor means and electronic switch means for sending an electrical signal to the electronic processor means when the actuation means recognizes that the label-carrying means has reached a lower limit in the label-applying position, which varies from article to article in said series of articles.

A further feature of the invention is directed to the label carrying means which includes a head portion, a boom portion and conveying means for vertically moving the boom portion and head portion. Path defining means restricts movement of the label carrying means along a predetermined conveying path. Drive means includes motor means for driving the label-carrying means upwardly and downwardly between the home position and the label-applying position. In a specific embodiment, the conveyor means includes a vertically disposed rotatable screw member and collar means mounted to move upwardly and downwardly along the screw member as the screw member rotates either clockwise or counterclockwise. The motor means includes reversible motor having brake means and is coupled to rotate the screw member clockwise and counterclockwise. The boom portion is connected to the collar means for movement in a direction transverse to the vertical direction of movement along the screw member.

The method of the invention comprises the operation of a package driven system for applying labels to articles such as packaged materials. The method comprises disposing an article in a predetermined aligned position within a label-receiving work station. When the article is disposed in the aligned position within the label-receiving or label-application work station, its presence is recognized and label transport means is then activated for transporting a price-printed label from a home position at a label-printing means to a label-applying position adjacent to the outer surface of the article. When the label transport means has applied the price-printed label to the outer surface of the article, that condition is first recognized and then the label transport means is returned to the home position in response to actuation means when the label transport means has applied the price-printed label. In a specific embodiment, the sensing means for recognizing the presence of an article in the label-receiving work station comprises feeler means that physically touches the article and automatically activates the label transport means. The article is manually placed in the aligned position within the label-receiving work station.

BRIEF DESCRIPTION OF THE DRAWINGS

Other objects of this invention will appear in the following description and appended claims, references being made to the accompanying drawings forming a part of the specification wherein like reference characters designate corresponding parts in the several views.

FIG. 5 is a schematic flow diagram showing the interrelationship of the various operational parts of the assembly made in accordance with the invention.

DETAILED DESCRIPTION

Figure 1:
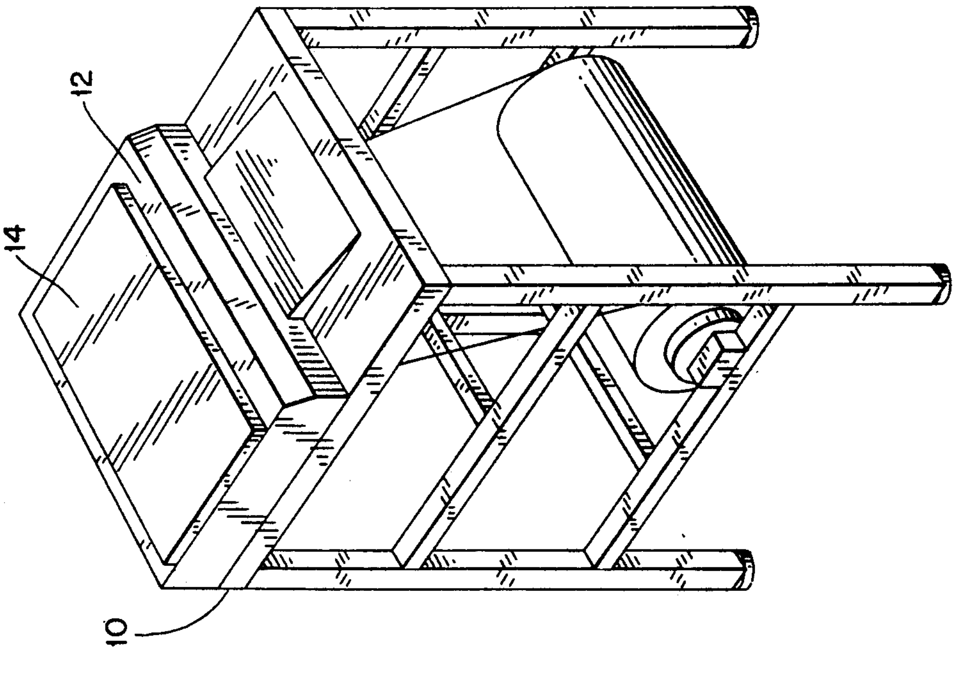
FIG. 1 is a perspective view of a weighing and wrap station as found in the prior art.

Referring to FIG. 1, a package film wrapping console generally designated 10, supports a scale 12 and platter 14. An unwrapped tray containing product is manually placed on the platter 14 in preparation of manually film wrapping the tray and its contents. The scale 12 senses the weight of the tray and contents resting on the platter 14 and transmits weight signal information to a scale controller that computes the data and sends printing instructions to the label printer 22 as shown in FIG. 2.

Figure 2:
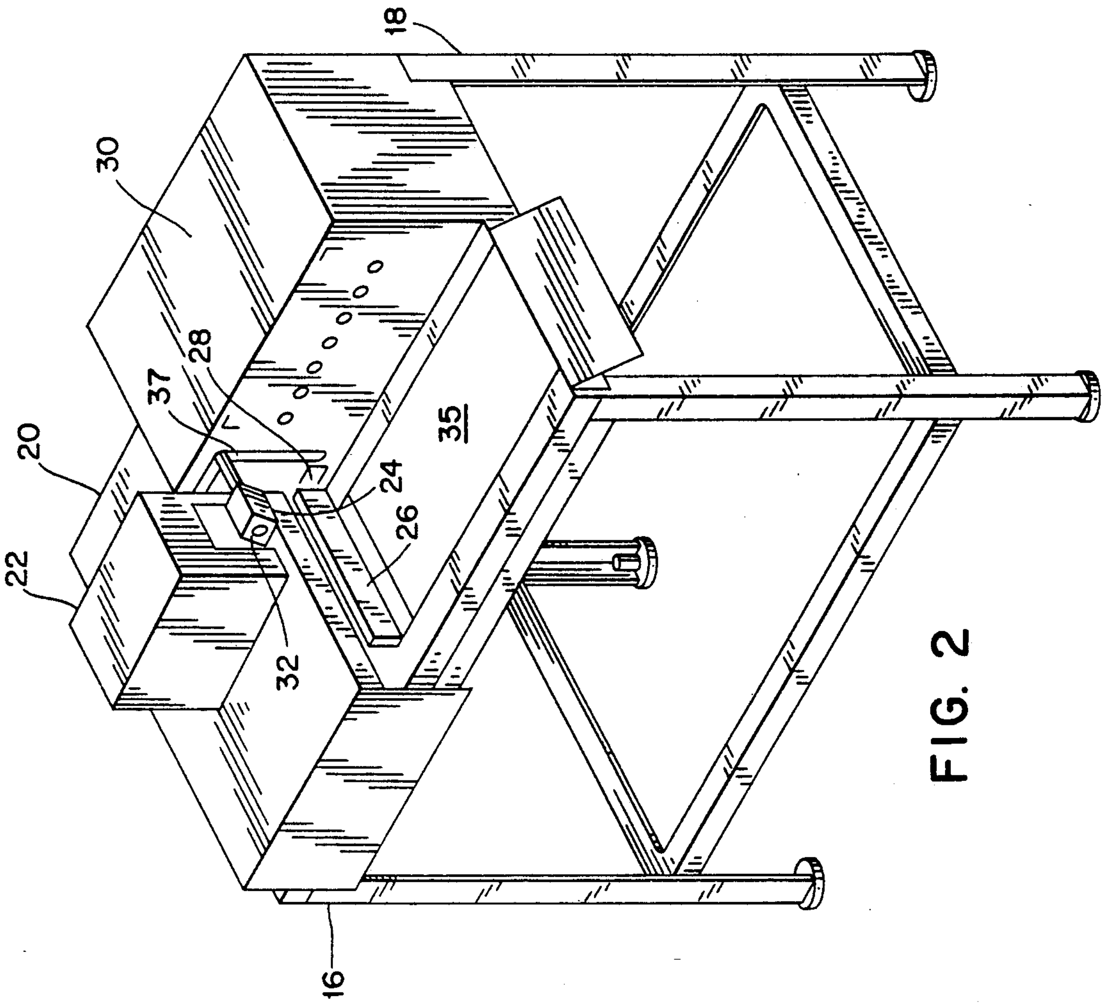
FIG. 2 is a perspective of an assembly made in accordance with the invention.

Referring to FIG. 2, automatic label pickup and applying apparatus, generally designated 16 comprises a suitable supporting framework 18 on which is mounted an adjustable table 20 to accommodate the various heights of a pressure sensitive (adhesive) label printer 22. A printer, having received printing instructions, prints out the data on to a pressure sensitive (adhesive) label causing the label to be fed over the printer's peeling bar (not shown).

Figure 3:
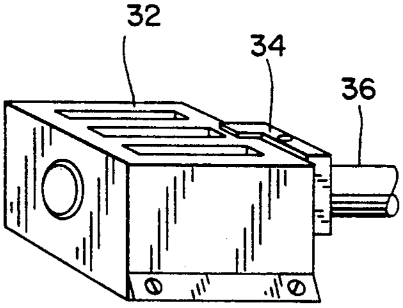
FIG. 3 is a fragmentary perspective view of a label applicator head and boom portion in accordance with the invention.

Thus, the adhesive side of the label is separated from its backing paper and the topside (non-adhesive side) of the label slides onto the underside of the label applicator head 32 as shown in FIG. 3. The label is held in a stationary position on the label applicator head by suction created by a motorized blower fan (not shown) housed in the label applicator head 32. Referring to FIG. 2, a package stopper board 26 constitutes alignment means and a package sensing plate 28 in a sensing means for recognizing the presence of an article disposed adjacent the alignment means. The front side of an electro-mechanical component housing structure 30 provides a backing against which an unlabeled package is manually placed. The package is aligned in the label-receiving work station that when a label is applied to the unlabeled package, the label's edges run parallel to the sides of the package, which includes a standard rectangular tray with contents overwrapped in this specific embodiment.

As a result of manually placing the package against the package sensing plate 28, an electronic microswitch located inside the electro-mechanical component housing structure 30 is closed thereby directing an electrical signal to an electronic processor that a weighed film-wrapped package is in place for labeling. The label is subsequently transported by the label applicator head 32 from the home position onto the film surface of the package. The fixed orientation of the label is dependent upon the manual placement of the package in the label-receiving work station.

Figure 4:
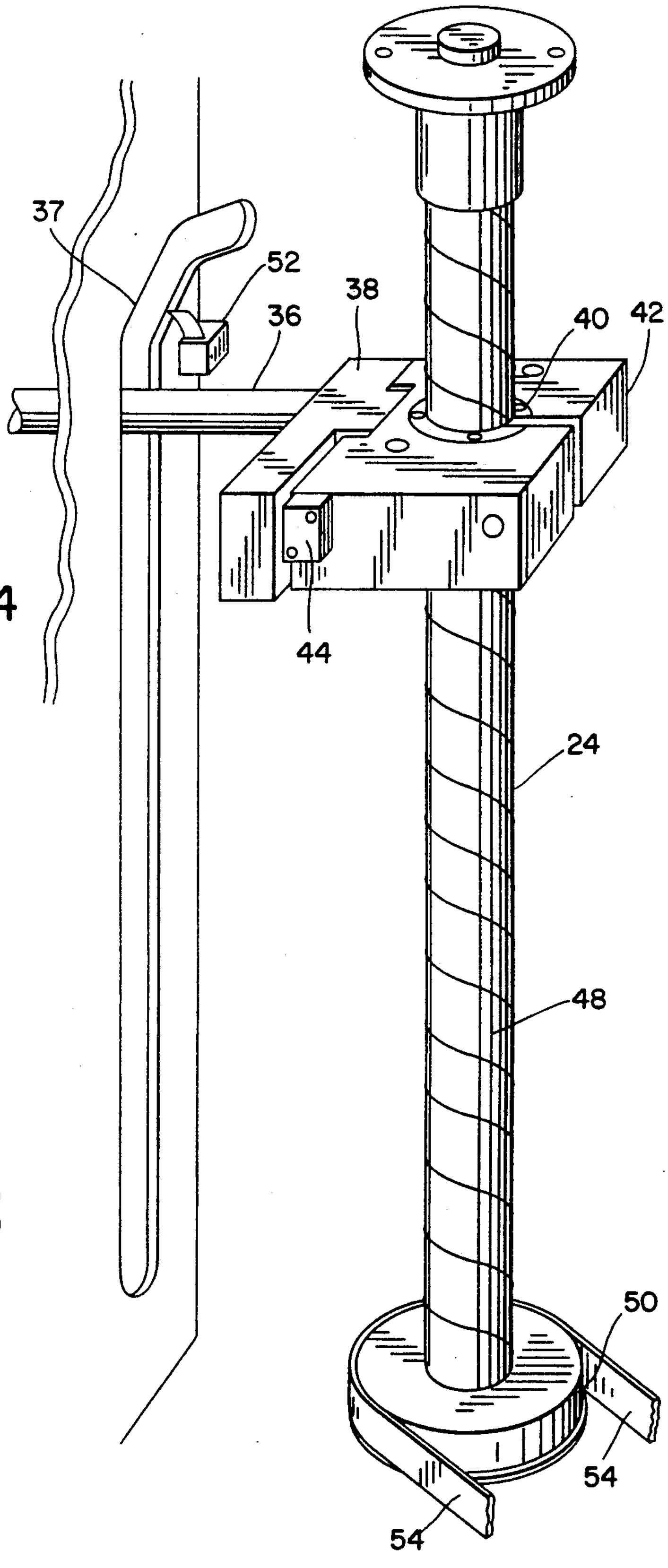
FIG. 4 is a fragmentary perspective view of a label transport conveying mechanism made in accordance with the invention.

Referring to FIGS. 3 and 4, label applicator apparatus 24 includes a label applicator head 32 housing a motorized blower fan, a spring-loaded locking plate 34, a boom 36, a hinge mechanism 38, a collar 40, a block 42, a microswitch 44, a vertically disposed lead screw drive belt 46, a lead screw 48, a timing pulley 50 and a lead screw drive motor with timing pulley.

The label applicator head 32 is preset in a receiving or home position one eighth to one quarter of an inch from the peeling bar of a remote pressure sensitive (adhesive) label printer 22 that dispenses price-printed labels. The receiving or home position is the first sequence position. And the system will always default to the receiving or home position after completion of the programmed sequence cycle or if the sequence cycle is interrupted.

As the label is peeled from the dispenser of printer 22, it moves from the peeling bar onto the lower surface of the label applicator head 32 and is held in place by suction caused by the motorized blower fan. When a package is placed against microswitch plate 28, a first microswitch is closed and directs an electric signal to the processor. And signaled and the processor energizes the reversible brake motor to turn its shaft in the direction that will drive the belt 54 attached to the lead screw timing pulley 50. Thus the lead screw 48 will turn in a direction that drives the collar 40 in a direction down the lead screw 48. As is evident in the drawings, the slot 37 comprises a path defining means that restricts movement of boom 36 along a predetermined conveying path. The speed of the collar 40 as it travels up or down the lead screw 48 is determined by the lead screw pitch, the rpm of the reversible motor and the lead screw timing pulley 50.

The combination of the collar 40, the hinge mechanism 38, the boom 36, and the label applicator head 32 travels as an assembly travels down the lead screw 48. The label is held on the label applicator head 32 by the suction created by the applicator blower fan. Upon contacting the package, the adhesive side of the pressure sensitive label is pressed against the film surface of the package causing the label to adhere, to the film. The label drops from the applicator head 32 because the labels' sticking capability is greater than the pull or suction of the applicator blower fan.

The applicator head 32 along with the collar 40, the boom 36, the hinge mechanism 38, the block 42 and the microswitch 44 are restricted from descending along the lead screw 48. As is evident in the drawings, this stoppage of the applicator assembly pivotally thrusts the label applicator head 32, the boom 36 and the hinge mechanism 38 above the line of descent of the block 42, the collar 40 and the microswitch 44 thereby causing the hinge 38 to pivot with respect to the collar 40 and depress the microswitch 44 which sends an electrical signal to the processor that the assembly has reached its lower limit.

In turn, the processor signals the brakes of the reversible brake motor to engage thereby stopping the motor drive. The motor brakes automatically release and the motor starts turning in reverse direction thereby driving the lead screw pulley 50 and lead screw 48 in right clockwise to left counterclockwise direction. Thus the collar 40, the block 42, the microswitch 44, the hinge mechanism 38, the boom 36 and label applicator head 32 are sent in an upward direction toward the upper limit microswitch 52. As a result of this action, the processor referring to FIG. 2. The reversible conveyor motor drives the conveyor timing belt 54 a distance whose duration is regulated by a timer in the processor that turns off the reversible conveyor motor.

Upon reaching the upper limit microswitch 52 of the lead screw assembly is closed and sends an electrical signal to the processor to engage the lead screw reversible motor brakes and stop the lead screw reversible motor, when the head 32 is in the home position. Thus the label applicator apparatus is ready to receive another pressure sensitive (adhesive) label as is it is peeled from its backing paper by the peeling bar of the remote pressure sensitive (adhesive) label dispenser of printer 22.

As described herein, the free-standing assembly shown in FIG. 2 is for automatically applying pressure sensitive adhesive labels to packages and containers. As shown, the alignment stopper board 26 and the front side of housing structure 30 receive a wrapped package so that it has a strict orientation with respect to a remote label peeling or dispensing mechanism. The aligned package rests on a removal conveyor 35 that discharges the packages only after the pressure sensitive adhesive label has been applied to the package. Once the labeled package is discharged, the removal conveyor 35 is stopped to receive the next package to be labeled in the label application work station. The electronic processor effects the various starting the stopping functions as it receives the various signals from the sensing, switch, and actuation means as described herein.

While the label pickup and applicator assembly and method have been shown and described in detail, it is obvious that this invention is not to be considered as limited to the exact form disclosed, and that changes in detail and construction may be made therein within the scope of the invention without departing from the spirit thereof.

SUMMARY OF THE INVENTION

Automatic label applying apparatus of the invention accordance with the invention comprises a mounting table for the remote label printer, where a reciprocally moving applicator head receives as a pressure sensitive (adhesive) label as it is peeled from the label dispensing peeling bar of the printer and applies the label to the surface of the package in various orientations and locations, after which the package is transported by conveyor to a finished goods area.

Automatic label applying apparatus in accordance with the invention operates free of the prior art that set a duration for each operation by setting a rheostat to speed or slow a drive motor that requires for different sizes of packages and/or weights a set duration for each operation by setting a rheostat to speed a drive motor speeds and/or gear and cam sizes for different sizes of packages and/or weights of packages.

What is claimed is:

1. An assembly for automatically applying a price-printed label onto each of a series of random weight articles each having an outer surface differing from each other, said assembly comprising:

a) alignment means for disposing each of said articles one at a time in a predetermined position within a label application work station, b) sensing means for recognizing the presence of said random weight article disposed adjacent the alignment means, c) label transport means for transporting a price-printed label from a home position at a label dispensing peeling bar of a label printing means to a random distance label-applying position contiguous the differently shaped outer surface of each successive random weight article, d) initiating means including first switch means responsive to the sensing means for activating the label transport means to move from the home position toward the outer surface of the article, e) actuation means for activating second switch means for stopping movement toward the article at a random distance limit from the home position when the label transport means has applied the price-printed label to the shaped outer surface of each random weight article, and f) retracting means responsive to the activation of the second switch means for returning the label transport means from said random distance label-applying position to said home position.

2. An assembly as defined in claim 1 wherein the alignment means includes article support surface means and article stopper means, and the sensing means includes feeler means disposed to touch an article supported by the article support surface means and located adjacent the article stopper means.

3. An assembly as defined in claim 2 wherein the feeler means includes a package sensing plate, and the initiating means includes control means responsive to the first switch means when said plate touches an article disposed in the label application work station, and said control means being effective to activate the label transport means.

4. An assembly as defined in claim 1 wherein the label transport means includes label-carrying means and drive means for effecting movement of the label-carrying means between the home position and the random distance label-applying position.

5. An assembly as defined in claim 4 wherein the initiating means includes first control means responsive to the first switch means when an article is recognized within the label application work station, said first control means being effective to activate said drive means for operating the label-carrying means from the home position to the random distance label-applying position.

6. An assembly as defined in claim 5 wherein the first control means includes electronic processor means, and said first switch means sends an electrical signal to the electronic processor means when an article is recognized by the sensing means.

7. An assembly as defined in claim 4 wherein the retracting means includes second control means responsive to the second switch means when the label transport means has completed the application of a price-printed label to the article, said second control means being effective to activate said drive means for returning the label transport means from the random distance label-applying position to the home position.

8. An assembly as defined in claim 7 wherein the second control means includes electronic processor means, and said second switch means means an electrical signal to the electronic processor means when the label-carrying means has reached a lower random limit in the random distance label-applying position which varies from article to article in said series of articles.

9. An assembly as defined in claim 4 wherein the label-carrying means includes a head portion, a boom portion, conveying means for vertically moving the boom portion and head portion, and path defining means for restricting movement of the label-carrying means when moved by the conveying means along a predetermined conveying path, the drive means includes brake motor means for driving the label-carrying means upwardly and downwardly between said home position and said random distance label-applying position.

10. An assembly as defined in claim 9 wherein the conveying means includes a vertically disposed rotatable screw member and collar means mounted to move upwardly and downwardly along the screw member as the screw member rotates either clockwise or counterclockwise, the brake motor means includes a reversible brake motor coupled to rotate the screw member clockwise and counterclockwise, said path defining means being effective to cause the boom portion to move in a direction transverse to the vertical direction of movement along the screw member.

11. A method for automatically applying a price-printed label onto each of a series of random weight packages having a rectangular tray with contents overwrapped to form a shaped outer surface differing from package to package, said method comprising:

a) disposing each package one at a time in a predetermined aligned position within a label application work station, b) providing means for sensing the presence of each package when it is disposed in the aligned position within the label application work station, p1 c) providing label transport means for transporting a price-printed label from a home position at a label dispensing peeling bar of a label printing means to a random distance label-applying position contiguous the outer surface of each package, d) activating the label transport means for transporting the price-printed label from the home position to the random distance label-applying position, e) providing means for indicating when the label transport means has applied the price-printed label to the outer surface of each package at a lower random limit in the random distance label-applying position, f) returning the label transport means to said home position when the label transport means has reached said lower random limit, and g) discharging each package from the label application work station after the label transport means is clear of each label-bearing package.

12. A method as defined in claim 11 wherein the package disposing step includes manually placing each package in said aligned position within the label application work station.

13. A free-standing assembly for automatically applying a price-printed label onto a series of random weight packages each having a shaped outer surface, said assembly comprising:

a) framework means for supporting label printing means, a label application work station, and labeled-package discharge means, said label application work station including alignment means for disposing each package in a predetermined position within the label application work station, b) sensing means for recognizing the presence of each package disposed adjacent the alignment means, c) said label printing means including label dispensing means with a label dispensing peeling bar that defines a home position for label transport means having an applicator head that receives a label as it is peeled from the label dispensing peeling bar after a package is weighed, d) said label transport means is for transporting a price-printed label from the home position at the label printing means to the outer surface of a package, e) first switch means responsive to the sensing means for activating the label transport means to move toward the package from the home position to the outer surface of the package, f) actuation means for activating second switch means for stopping movement of the label transport means toward the package at a lower random limit in a random distance label-applying position when the label transport means has applied the price-printed label to the outer surface of the package, g) retracting means responsive to the activation of the second switch means for returning the label transport means to said home position, and h) removal conveyor means for discharging the labeled package from the label application work station.

14. An assembly as defined in claim 13 wherein the label application work station includes said removal conveyor means which operates only after each package has been labeled.

15. An assembly as defined in claim 13 wherein 'the label dispensing means dispenses pressure sensitive adhesive labels.

16. An assembly as defined in claim 13 wherein the packages each include a rectangular tray with contents overwrapped to form a shaped outer surface differing from package to package, said alignment means includes a guide member disposed at a right angle to a wall portion to receive said rectangular tray.

17. An assembly as defined in claim 13 wherein the label transport means includes a label applicator head that is disposed in a label-receiving position one eighth to one quarter of an inch from the peeling bar of a pressure sensitive adhesive label printer that dispenses price-printed labels.

18. An assembly as defined in claim 4 wherein the label-carrying means includes a rotatable screw member, collar means mounted to move up and down along the screw member as the screw member rotates either clockwise or counterclockwise, the label-carrying means further includes a head portion mounted at one end of a boom portion and coupling means mounted at the other end of the boom portion, said coupling means includes hinge means connecting the boom portion to the collar means thereby allowing the boom portion to pivot with respect to said collar means and activate the second switch means when the label has been applied to the outer surface and the label transport means has reached said random distance limit.

19. An assembly as defined in claim 9 wherein the path defining means includes a wall portion having an elongated slot within which the boom portion moves vertically upwardly and downwardly with respect to the article.

20. An assembly for automatically applying a price-printed label onto a series of random weight packages each having a shaped outer surface, said assembly comprising:

a) means for aligning each package in a predetermined position within a label application work station, b) sensing means for recognizing the presence of each package disposed in the label application work station, c) means for supporting label printing means including label dispensing means with a label dispensing peeling bar that defines a home position for label transport means having an applicator head that receives a label as it is peeled from the label dispensing peeling bar after a package is weighed, d) said label transport means is effective to transport a price-printed label from the home position at the label printing means to a random distance label-applying position contiguous the outer surface of a package, e) means responsive to the sensing means for activating the label transport means to move toward the package from the home position to the random distance label-applying position, f) means for stopping movement of the label transport means toward the package when the label transport means has applied the price-printed label to the outer surface of the package and has reached a lower random limit which varies from package to package in said series of packages, and g) retracting means for returning the label transport means to said home position once the label transport means has reached said lower random limit.

21. A method for automatically applying a price-printed label onto a series of random weight packages each having a shaped outer surface, said method comprising:

a) disposing each package in a predetermined position within a label application work station, b) sensing the presence of each package disposed in the label application work station, c) supporting label printing means including label dispensing means with a label dispensing peeling bar that defines a home position for label transport means having an applicator head that receives a label as it is peeled from the label dispensing peeling bar after a package is weighed, d) moving said label transport means toward a package to transport a price-printed label from the home position at the label printing means to a random distance label-applying position contiguous the outer surface of the package, e) stopping movement of the label transport means toward the package when the label transport means has reached a lower random limit which varies from package to package in said series of packages to apply the price-printed label to the outer surface of the package, and f) returning the label transport means from said lower random limit to said home position.

* * * * *